(12) United States Patent
Matschl et al.

(10) Patent No.: US 8,152,880 B2
(45) Date of Patent: Apr. 10, 2012

(54) AIR INTAKE APPARATUS

(75) Inventors: Gerald Matschl, Mattighofen (AT); Torbjörn Gustafson, Berndorf (AT)

(73) Assignee: KTM Sportmotorcycle AG, Mattighofen (AT)

( * ) Notice: Subject to any disclaimer, the term of this patent is extended or adjusted under 35 U.S.C. 154(b) by 613 days.

(21) Appl. No.: 12/151,864

(22) Filed: May 9, 2008

(65) Prior Publication Data

US 2008/0282654 A1 Nov. 20, 2008

(30) Foreign Application Priority Data

May 9, 2007 (DE) .......................... 10 2007 021 756

(51) Int. Cl.
*B01D 46/00* (2006.01)
(52) U.S. Cl. .................. 55/385.3; 55/493; 123/198 E
(58) Field of Classification Search ................. 55/385.3, 55/493, 498, 503, 504, 510, 484, 417, 529, 55/DIG. 28, DIG. 30; 123/198 E, 184.21; 60/282, 304; 180/313; 73/118.1
See application file for complete search history.

(56) References Cited

U.S. PATENT DOCUMENTS

| | | | | |
|---|---|---|---|---|
| 3,641,746 A * | 2/1972 | Smith et al. | ............... | 55/385.3 |
| 4,932,490 A * | 6/1990 | Dewey | ............... | 180/68.3 |
| 6,231,630 B1 * | 5/2001 | Ernst et al. | ............... | 55/385.3 |
| 6,251,151 B1 * | 6/2001 | Kobayashi et al. | ............... | 55/309 |
| 6,287,354 B1 * | 9/2001 | Nozaki | ............... | 55/385.3 |
| 6,892,842 B2 * | 5/2005 | Bouffard et al. | ............... | 180/68.3 |
| 7,090,710 B2 * | 8/2006 | Choi | ............... | 55/385.3 |
| 7,361,201 B2 * | 4/2008 | Nakagome et al. | ............... | 55/385.3 |
| 7,485,168 B2 * | 2/2009 | Goupil, Jr. | ............... | 55/385.1 |
| 7,604,677 B2 * | 10/2009 | Tsuruta et al. | ............... | 55/385.3 |
| 7,753,980 B2 * | 7/2010 | Kobayashi et al. | ............... | 55/495 |
| 2001/0003980 A1 * | 6/2001 | Kawamoto et al. | ............... | 123/579 |
| 2004/0187828 A1 | 9/2004 | Yasuda et al. | | |
| 2007/0012274 A1 * | 1/2007 | Kawatani | ............... | 123/184.21 |
| 2007/0095324 A1 * | 5/2007 | Takahashi et al. | ............... | 123/198 E |
| 2008/0083200 A1 * | 4/2008 | Gruber et al. | ............... | 55/385.3 |
| 2008/0098701 A1 * | 5/2008 | Takeshima et al. | ............... | 55/385.3 |
| 2010/0044136 A1 * | 2/2010 | Suzuki | ............... | 180/219 |
| 2010/0078239 A1 * | 4/2010 | Beloy | ............... | 180/68.3 |

FOREIGN PATENT DOCUMENTS

DE 20 04 630 A 8/1971
WO WO 2005/095783 A1 10/2005

* cited by examiner

*Primary Examiner* — Duane Smith
*Assistant Examiner* — Minh-Chau Pham
(74) *Attorney, Agent, or Firm* — Rod D. Baker

(57) ABSTRACT

An air intake apparatus for a vehicle powered by an internal combustion engine. There is disclosed an air intake apparatus including ducting members for fluidly communicating cleaned intake air, for combustion, in the direction of the internal combustion engine. The apparatus also features an air filter element arranged on the duct members, as well as a case for housing the air filter element. The communicating duct members are engineered such that the air filter element can be pivoted from the case to an open position, such as for cleaning, while nevertheless remaining upon on the air communicating duct members.

15 Claims, 4 Drawing Sheets

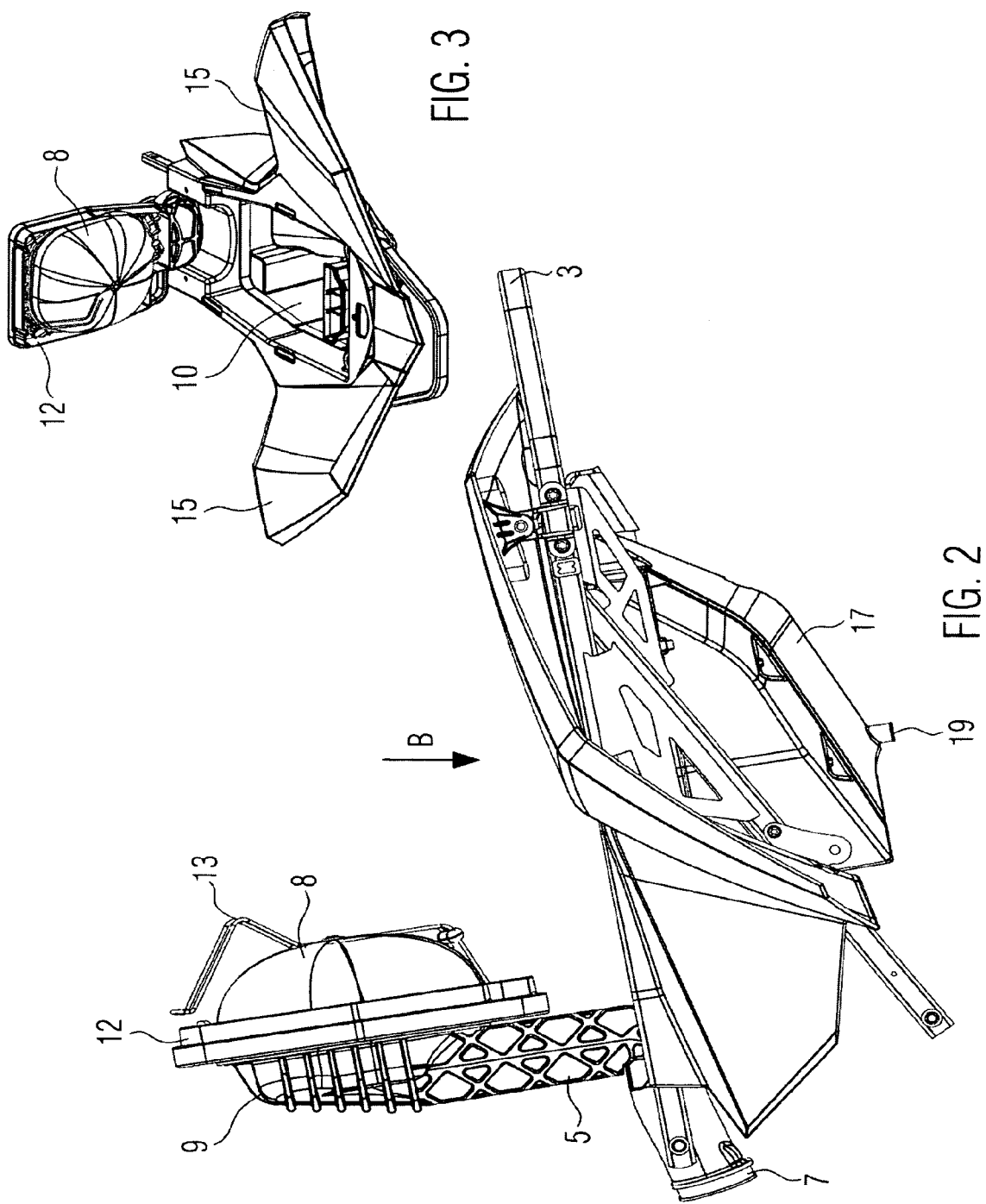

AIR INTAKE APPARATUS

CROSS-REFERENCE TO RELATED APPLICATIONS

This application claims priority to German Patent Application No. DE 10 2007 021 756.2, filed on May 9, 2007, the entirety of which is incorporated herein by reference.

BACKGROUND OF THE INVENTION

1. Field of the Invention

The present invention relates to air intake apparatuses for vehicles powered by an internal combustion engine, and more specifically to an air intake apparatus including elements for fluidly communicating cleaned intake air in the direction of the engine for combustion therein, an air filter element, and a case housing the air filter element.

2. Background Art

Any vehicle comprising an internal combustion engine usually features an air intake apparatus for supplying air to the engine for combustion. The air intake apparatus typically includes an air filter element serving to clean the intake air to remove debris in the form of dirt, water, sand, grit and the like from the intake air in passing through the air filter element which can build up therein, forming there a filter cake.

Such an efficient cleaning of intake air is especially needed on vehicles negotiating rough terrain, such as, for example, off-road competition motorcycles or so-called all-terrain vehicles (ATV). On such a vehicle, to maintain high engine performance, it is necessary to clean frequently the air filter element to remove the particles collected thereon. The cleaning is essential so that the pressure drop in communicating the flow of intake air through the air filter element is not substantially increased.

Known air intake assemblies employed on ATVs commonly include an air filter element arranged in a case located beneath the rider saddle of the ATV. The air filter element takes the form of an elongated cylinder having a coupling at the face side of the cylinder, for engagement with at a complementary-configured coupling on the case, the engagement often by means of a screw clip, whereby the known air filter element is screwed to the coupling of the case. When this known air filter element needs to be cleaned, first the lid of the case has to be removed. For this purpose the bolts securing the lid to the case have to be loosened by means of a tool, or fasteners clamping the lid to the case must be opened. Then, again by means of a tool, a screw coupling of the clip needs to be opened so that ultimately the air filter element can be withdrawn from the coupling in the case, and through the opening in the case formerly closed off by the lid.

A further known air intake apparatus features a cylindrically-shaped foam plastics member arranged on a support and disposed in a case housing the air filter element. Connection is by means of a screw extending along the longitudinal centerline of the cylindrical air filter element push-mounted in the region of a case on the air filter element via a correspondingly-configured coupling before being bolted by means of a tool. To remove the air filter element from this type of known air intake apparatus, a tool must be used to first unbolt the air filter element before it can be withdrawn from the case. Once cleaned, the air filter element then has to be reinserted into the case in the reverse sequence, and again by means of a tool the bolted fastener between the air filter element and the case coupling retightened.

The case in both instances is arranged beneath the rider saddle and a gap is provided between the case and the mudguards covering the rear wheels of the cited ATV. This gap results in debris such as dirt, sand and/or grit thrown up by the rear wheels gaining access to the case through the gap, quickly fouling up the air filter element.

Cleaning the air filter element on the cited known air intake assemblies is impossible without the aid a tool. Moreover, cleaning is time-consuming because every time bolts must first be loosened before, in a next step, the air filter element can be removed from its case. After the air filter element has been cleaned, it must be reinserted in the case in the reverse sequence and then the bolt fastener retightened.

It is on the basis of this that the present invention has the object of eliminating the above drawbacks. According to the new disclosure hereafter, there is provided an air intake apparatus for a vehicle powered by an internal combustion engine which apparatus makes it possible to remove the air filter element from the case without having to use a tool, thus expediting cleaning of the air filter element.

SUMMARY OF THE INVENTION

There is described an air intake apparatus for a vehicle powered by an internal combustion engine, comprising a means fluidly communicating cleaned intake air for combustion in the direction of the internal combustion engine and an air filter element arranged on the means as well as a case housing the air filter element, the means being engineered such that the air filter element can be hinged open from the case whilst remaining located on the means.

The air intake apparatus in accordance with the present disclosure thus is characterized in that, among other things, the air filter element can be removed out of the case without the aid of a tool, in thereby performing a movement that is guided by apparatus elements and whereby the filter element remains located on the overall apparatus. During filter cleaning the apparatus is hinged open from the case, meaning that together with being hinged open, or by a rotating movement, the air filter element can be moved out of the case housing it, without requiring the assistance of a tool.

The air filter element hinged open from the case can then be separated from the apparatus, again without requiring the assistance of a tool—i.e., removed for cleaning, for example. Afterwards the air filter element is releasably reattached, and hinged back into the case.

For this purpose it is provided for in accordance with one aspect of the disclosed apparatus that the fluid communication elements include a section at which the air filter element can be releasably attached, and the section can be mounted on the case to thereby form a lid of the case.

In other words, a section of the fluid communication elements can be engineered so that the air filter element can be releasably attached thereto, this filter attachment section also forming a lid of the case. Hinging open the communication components removes the section from the case, whilst simultaneously hinging open the air filter element from the case. Similarly, the air filter element is hinged back into the case by a return hinging motion, and the section defined at the case to simultaneously form the lid of the case in protecting the case from debris such as dirt, water, sand, grit and the like.

In accordance with another aspect of the disclosed apparatus, it is provided that the fluid communication means includes a duct fluidly communicating intake air, the duct featuring a closed profile cross-section, and engineered to be integrally formed with a curved element opening towards the filter attachment section, which can be attached at the section. The duct is formed at the end portion opposite the element for arrangement at a throttle member or a carburetor member of the internal combustion engine.

The duct configured by a closed profile cross-section may have, for example, a circular cross-section or a cross-section similar in form to an ellipsis. It preferably features at its end portion, directed towards the aforementioned section, an open curved member (for example a member configured similar to a dome) for passage of the intake air which is engineered integrally with the duct. This, for example, domed member can then be attached to the section, for example by detents configured at the member and latching in corresponding holes of the section simultaneously forming the lid of the case.

To fluidly communicate the intake air cleaned by the air filter element to the internal combustion engine, it is directed through the duct which at its end portion opposite the domed member is configured so that it can be defined at a throttle member or carburetor member of the internal combustion engine.

To attain the hinging action of the communication means, it is provided for in accordance with another aspect of the disclosed apparatus that the fluid communication elements are configured flexible in the region of a duct which conveys cleaned intake air in the direction of the engine. The communication element can be hinged open from the plane of a lid of the case. Thus, the duct may be made of an elastomer such as, for example, nitrile butyl rubber, so that the air filter element releasably attached at the section can be hinged open from the case by hinging open the section together with the open curved member. When the air filter element is in the fitted position on the vehicle, for example, oriented in a direction upwards, the flexible duct thereby provides a hinge so that, as compared to its fitted position in the case, the air filter element can be hinged open by an angle of (for example) approximately 60 to 120 degrees to be freely accessible.

In this position, the air filter element can be released from the section without the aid of a tool, for instance, for cleaning it. After cleaning, the air filter element can be releasably reattached at the section and hingeably moved back into the case, simply by moving the flexible duct back in the opposite direction. The air filter element, together with the section and the curved member, accordingly are hinged back into their initial position. This makes it possible to remove the air filter element practically instantly without having to use a tool as is the case with known air intake assemblies.

To avoid pulsation of the flexible duct due to the pulsating flow in the air column, in another aspect of the disclosed apparatus the duct is provided within its closed profile with at least one longitudinal bracing rib, extending, for example, approximately from one end portion to approximately the other end portion of the duct. The rigidity of the duct can be influenced by the number of bracing ribs provided. Thus, four such bracing ribs may be provided along the inner circumference of the duct, so that despite its flexible configuration it does not tend to pulsate because of the pulsating gas flow.

In accordance with yet another aspect, to increase the surface area of the air filter element through which the intake air can flow, the air filter element is a dome-shaped foam plastic element with a sealing edge arranged at a ported retainer, and featuring a spring clip for bringing the sealing edge into contact with a section of the communication elements. It is this dome-shaped configuration that achieves an increase in the surface area of the air filter element through which the intake air can flow. The air filter element can be made of a foam plastics material for forming a scrubber. This foam plastics material can be arranged at a complementary-shaped retainer ported for passage of intake air. It may be attached with a spring clip; the sealing edge of the thus-tensioned air filter element is urged by the spring clip into contact by the lid section of the fluid communication elements which, for example, may be the aforementioned lid of the case. The spring clip ensures that the air filter element is urged by its sealing edge against the lid, thus preventing the ingress of entrained debris into the air intake duct. When the air filter element needs to be cleaned, all that needs to be done is to release the spring clip so that the air filter element can be removed. To fit the air filter element to the section or lid, it is located by its sealing edge on the lid and then urged tight against the lid by the spring bias of the spring clip.

To achieve a self-cleaning effect of the foam plastic element, it is provided for in accordance with still another aspect of the disclosed apparatus that the foam plastic element can be brought into contact by the sealing edge with the section, so that the foam plastic element is suspended in the case. This makes it possible that the jolts occurring in operation of the vehicle cause any debris that has collected on the shell surface of the foam plastic element to drop down in the case.

As explained above, in known air intake assemblies there is a gap between the mudguards of the vehicle and the case housing the air filter element. This causes the drawback that debris thrown up by the vehicle may access, via the air intake portion, the interior of case.

To reduce contamination of the air filter element by debris thrown up by the wheels of the vehicle, it is provided for in another aspect of the disclosed apparatus that the case is engineered integrally with mudguards. In such an option, the mudguards extend in the longitudinal direction of the case, and away therefrom on both sides thereof. Because the mudguards are arranged above the wheels of the vehicle, this means that the configuration of the case with the mudguards extending away therefrom on both sides of the case ensures that there is no gap between the mudguards and the case. Elimination of the gap results in an elimination of debris directly gaining access to the region of the air intake ports of the case.

The case for mounting the air filter element thus forms with the mudguards an integral configuration which ensures that debris or water thrown up by the wheels can no longer gain access to the region of the air intake ports of the case. In addition, this configuration ensures that forming a case and mudguard no longer involves a plurality of components, each of which needs to be assembled in production of the vehicle. This reduces the tool-up time in vehicle production.

The case as engineered in accordance with this disclosure also ensures that no additional fairing items are needed to, for instance, prevent debris or water ingress into the region of the air intake ports in the case. In accordance with still another aspect of the disclosed apparatus, it may also be provided for that the case is fully preassembled with the complete air intake apparatus. Thus in production of the vehicle fitted as such, the integral assembly fully preassembled merely needs to be mounted on the frame structure of the vehicle.

It also is provided that the case has, at an end portion opposite a duct fluidly communicating in the longitudinal direction of the case, an air intake snorkel for fluidly communicating ambient air into the case. To reduce debris being entrained into the case it is provided for in yet another aspect of the disclosed apparatus that the air intake snorkel is configured for arrangement in the region below a rider saddle of the vehicle. Although ambient air to be cleaned gains access to the case via this air intake snorkel, because the air intake snorkel is arranged below the rider saddle of the vehicle, it is ensured that the ambient air passing through the air intake snorkel entrains less debris than would be the case, for example, were the air intake snorkel to be located fully exposed uncovered without protection.

In accordance with another aspect of the disclosed apparatus, it is provided for that the case has side walls integrally formed with a case floor, and configured in a region transversely to the longitudinal direction of the case similar to an inverted saddle roof, and featuring at its lowest point a drain port. This configuration promotes that any debris or moisture entering the case settles on the floor of the case. From there it progresses in the direction of the lowest point of the case floor, the floor being configured similar to an inverted saddle roof provided with a drain port (from which the debris is discharged from the case).

The air intake apparatus may be pre-fitted as a unit together with the case comprising the vehicle mudguards. In this arrangement, the air intake apparatus is adapted to be located beneath the rider saddle of the vehicle, so that the air intake snorkel is beneath the saddle. The vehicle concerned may be, for example, a two-track vehicle featuring a saddle for the rider and/or passenger and steered by means of a handle bar. The vehicle may be an all-terrain vehicle (ATV).

BRIEF DESCRIPTION OF THE DRAWINGS

The accompanying drawings, which are incorporated into and form a part of the specification, are for the purpose of illustrating a preferred embodiment of the apparatus, and are not to be construed as limiting the invention. The present disclosure will now be detailed with reference to the drawings, in which:

FIG. 2 is a view similar to that as shown in FIG. 1 with the rider saddle removed and in a position hinged open from a case;

FIG. 3 is a view similar to that as shown in FIG. frame structure 2 but in a view in perspective;

DESCRIPTION OF THE PREFERRED EMBODIMENTS

Best Mode for Practicing the Invention

Figure 1:
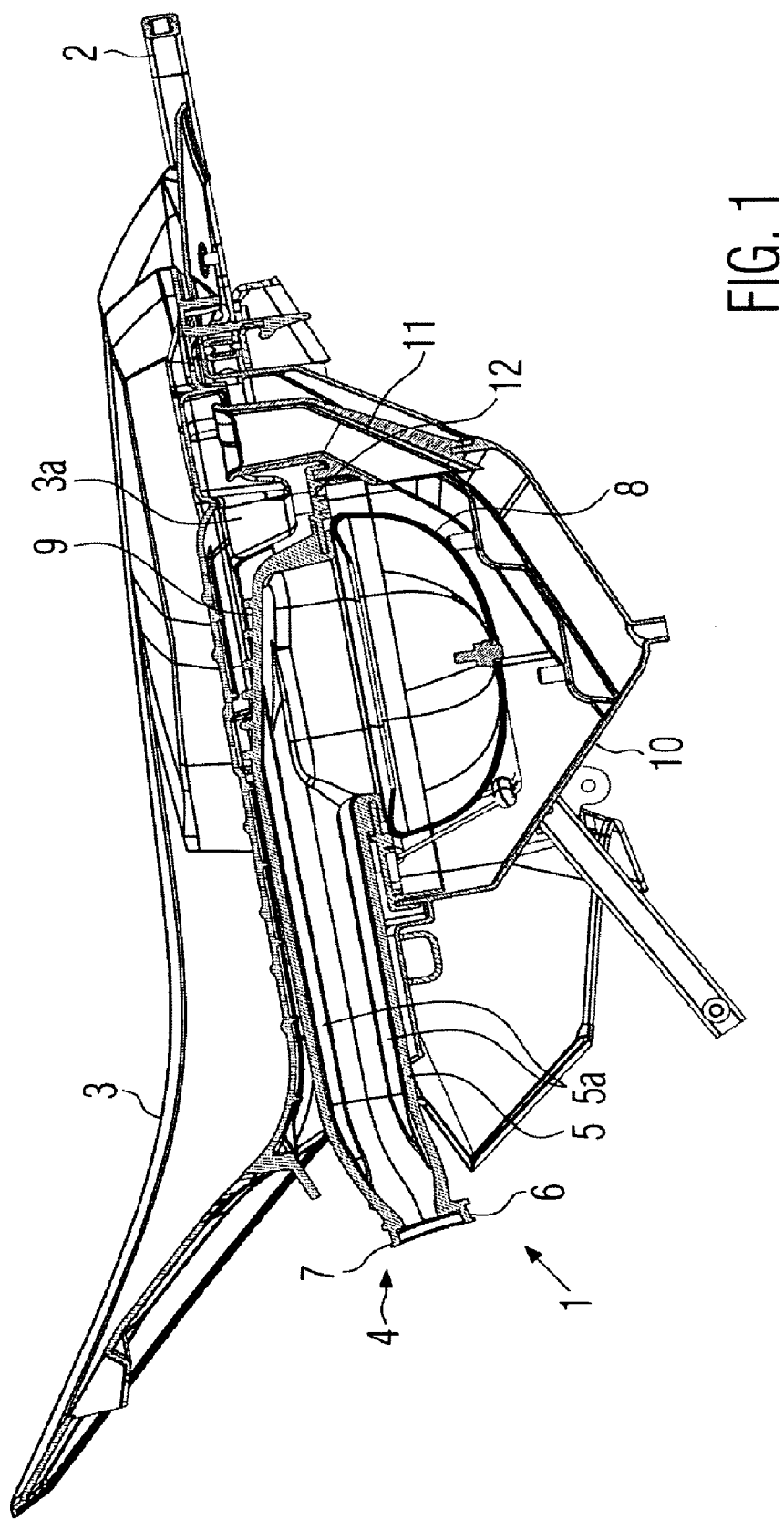
FIG. 1 is a section view of an air intake apparatus arranged at a frame structure of an ATV as shown in one embodiment in accordance with the present disclosure.

Referring now to FIG. 1 of the drawings, there is illustrated a section view of an air intake apparatus 1 in accordance with one embodiment of the present disclosure arranged on a frame structure 2 of an ATV.

Located at the frame structure 2 is a rider saddle 3 for a rider of the ATV. As is directly evident, the air intake apparatus 1 in the embodiment as shown is arranged beneath the saddle 3, so that the air intake apparatus 1 is already located where it is protected from dirt and water splash. For fluidly communicating cleaned intake air in the direction of the internal combustion engine (not shown), the air intake apparatus 1 comprises a communicating means 4 including a flexibly configured duct 5 via which cleaned intake air can be transported. At its end portion 6 facing the internal combustion engine, the duct 5 is engineered with a coupling 7 which is connectable to a throttle member or carburetor member of the internal combustion engine.

As viewed in the plane of the drawing as shown in FIG. 1, the duct 5 portion of the communicating means extends, aftwards in the longitudinal direction of the vehicle, from the coupling 7 and in the direction of an air filter element 8.

Figure 5:
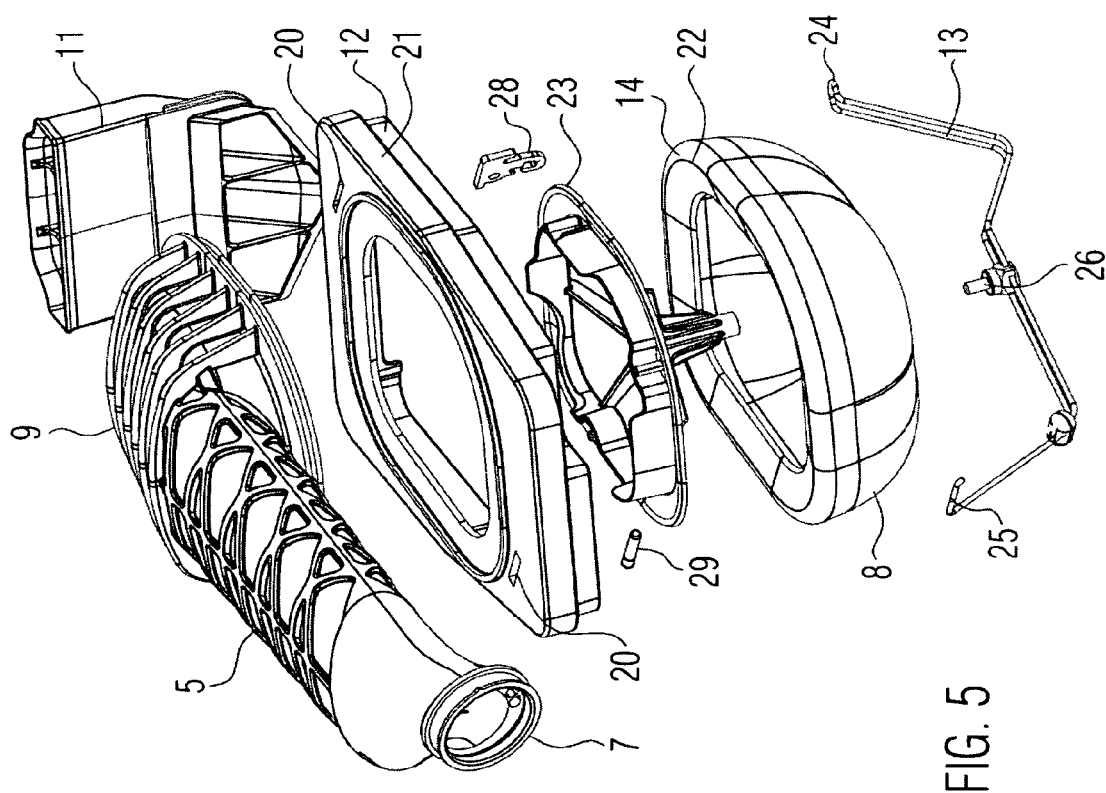
FIG. 5 is an exploded view of an air intake apparatus in accordance with the present disclosure.

As shown in more detail in FIG. 5, the duct 5 is engineered, for example, cross-sectionally oval or elliptical and features a closed profile. In this embodiment, the duct 5 is integrally formed, preferably integrally, with an openly curved element 9. Curved element 9 is configured domed, and may be made of an elastomer such as, for example, nitrile butyl rubber. This achieves a wanted elasticity or flexibility of the duct 5, so that the duct may serve as a hinge whereby the air filter element 8 can be pivotally moved away from a case 10 (particularly the top of the case) to an open position. In the open position shown in more detail in FIG. 3, the filter element 8 is freely accessible for cleaning.

Ambiently originating intake air can enter the case 10 via an air intake snorkel 11 arranged beneath the rider saddle 3, and can flow from there via the air filter element 8 where it is cleaned, and into the flexible duct 5. From the duct 5, the cleaned air flows via the coupling 7 to the internal combustion engine (not shown). On intake of the intake air for combustion, a pulsating air flow materializes in the duct 5. To prevent the duct 5 from negatively pulsating in sympathy, four longitudinal bracing ribs 5a (FIGS. 1 and 4) are provided along the inner circumference within the duct 5. Ribs 5a extend approximately from the end portion 6 of the duct 5 to approximately the opposite end portion, near the element 9.

When housing an air filter element 8, the case 10 is closed off by a lid section 12 (FIGS. 1-3) of the air intake apparatus 1, which section 12 simultaneously forms the lid of the case 10. During engine operation backfiring may occur, resulting in ignition of an air/fuel mixture flowing into the combustion chamber. This may cause a deflagration which is propagated as a pressure wave in the intake air portion, forcing the lid section 12 to the side walls 16 (FIG. 4) in engine operation, due to the negative pressure formed in the case 10. To ensure that the section 12 is not blown out from the side walls 16 on such a backfire, a flexible member made, for example, of foam plastic may be disposed between a protuberance 3a at the rider saddle 3 and the section 12. Such foam plastic member comes into contact with the protuberance 3a as soon as the lid section 12 is slightly lifted from the case 10, thus preventing any further lift-off of the section 12 from the top of the case 10.

So as to move the air filter element 8 from the top of the case 10 into the hinged open position as shown in FIGS. 2 and 3, the rider saddle 3 is removed or hinged open, for example at a joint located in a front end portion of the rider saddle. This provides access to the air intake apparatus 1. The air filter element 8 can then hingeably pivot, together with the lid section 12 and the domed open curved element 9, to the open position, with the flexible duct 5 simultaneously serving as a flexible joint.

No tool is needed to pivotally move open the air filter element 8 from the top of the case 10 as shown in FIGS. 2 and 3, resulting in the filter being instantly achieved as soon as the rider saddle 3 has been removed or likewise hinged open, providing immediate access to the air filter element 8, for example, for cleaning. For this purpose, the air filter element 8 formed by a domed foam plastics member can simply be removed from the lid 12 by releasing a spring clip 13 from its detent position with the lid section 12 (FIGS. 2 and 5). After this, the air filter element 8 can be removed and, for example, washed or otherwise cleaned. In the reverse sequence, the air filter element 8 is placed flush against the lid 12 by a the filter element's sealing edge 14 (as shown in detail in FIG. 5 of the drawing) before the spring clip 13 is engaged with the lid section 12. For this purpose, a sleeve 29 is provided at the underside of the lid 12, for rotatably engaging the spring clip 13 at one end 25. The other end 24 of the spring clip 13 can be engaged with a hook retainer 28 at the underside of the lid 12, so that the clip 13 urges the air filter element 8 against the lid 12.

After this, the air filter element 8 can be moved back into the case 10 by a pivoting down motion (in the direction of the arrow B in the plane of the drawing of FIG. 2) of the duct 5 together with the curved element 9, lid section 12, air filter element 8 together and the spring clip 13, resulting in the air filter element 8 being repositioned in the case 10. With the communicating means, including the duct 5 in the closed position shown in FIG. 1, the lid 12 and the case 10 close off the inner space 18 of the case 10. In this position, the air filter element 8 is located suspended within the case 10. In other words, the sealing edge 14 is located at the top in the yaw axis direction of the air filter element 8; when jolted in operation of the ATV, any debris having collected on the air filter element 8 falls by the force of gravity from the filter element, thus achieving a certain self-cleaning effect.

Figure 4:
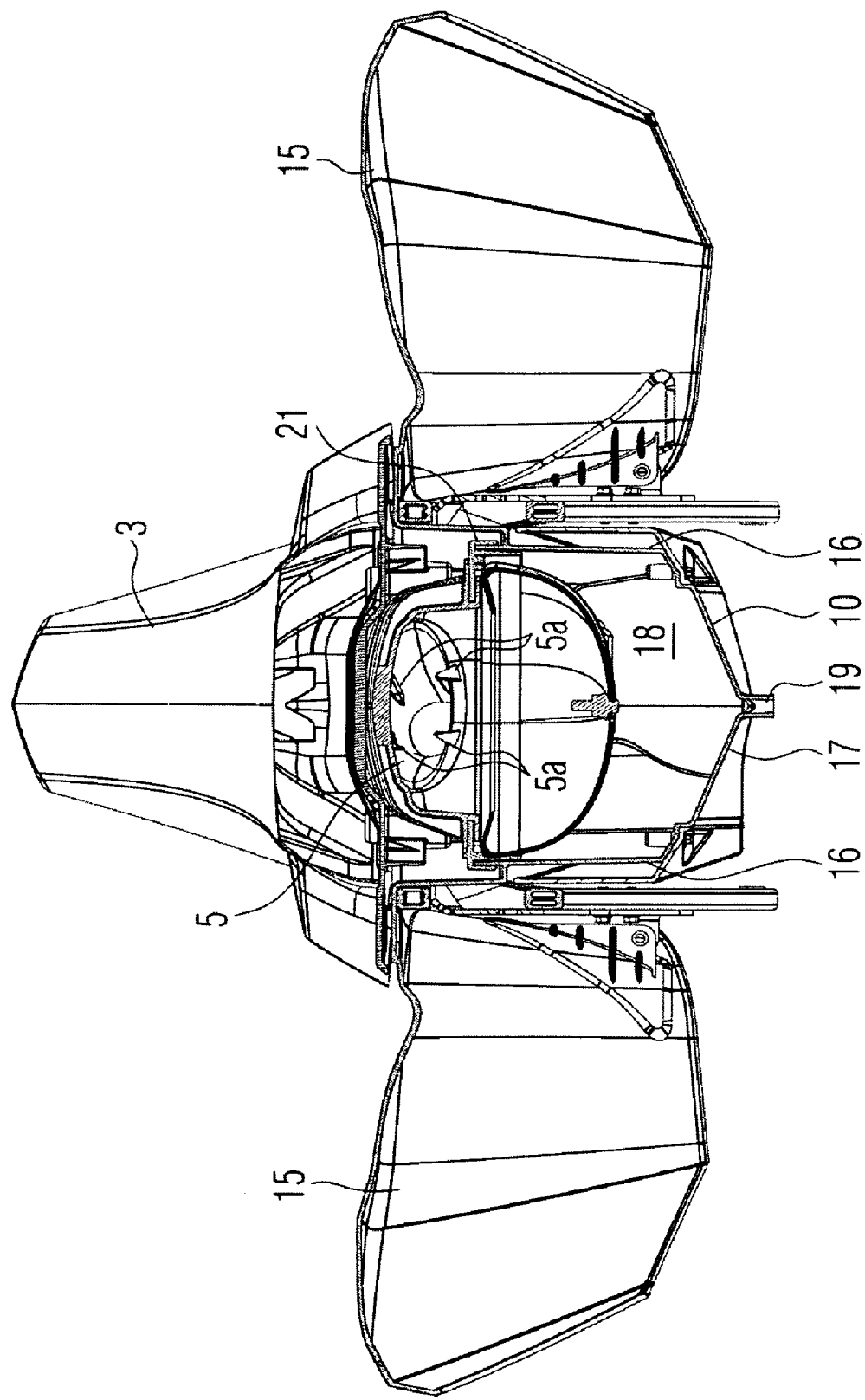
FIG. 4 is a cross-sectional view of the embodiment as shown in FIG. 1 in a view from the rear.

Referring now to FIG. 3 and FIG. 4, there is illustrated how the case 10 is engineered integrally with the mudguards 15. The mudguards extend laterally away from both sides of the case 10, and thus away from the wheels of the vehicle (not shown) located below the mudguards 15. Accordingly, any debris and/or water and the like thrown up in vehicle operation cannot gain access to the interior space 18 of the case 10, as is possible with known air intake apparatuses due to the gap between the mudguards 15 and the case 10.

FIG. 4 illustrates how the case 10 has side walls 16 engineered integrally formed with a case floor 17. In a preferred embodiment such as that shown, the case floor 17 is configured to have a trough-like shape, at least in a section transversely to the longitudinal direction of the case 10, approximating the shape of an inverted saddle roof. A "saddle roof" is one which follows a convex curve about one axis and a concave curve about the other. Reference also is made to FIGS. 1 and 2, showing that the inverted saddle-roof shape of the floor 17 leads down to a drain port at a lower portion thereof. It is this configuration which ensures that any debris having gained access to an inner space 18 of the case 10 flows in the direction of a drain port 19 located at the lowest point in the case floor 17, from where it can be discharged from the inner space 18 of the case 10.

Referring now to FIG. 5 of the drawings, there is illustrated, as an exploded view in perspective, an embodiment of the air intake assembly 1 in accordance with the present disclosure. The duct 5 preferably is engineered integrally with the domed or curved element 9, which latch locks into detent holes 20 of the lid 12 by detents (not shown because of the view in perspective).

The lid section 12 features a downswept circumferential edge 21 which contacts and clasps the side walls 16 when the lid 12 is arranged on the tops of the side walls 16 of the case 10. The domed air filter element 8 features, at a surface facing the lid 12, a sealing edge 14 which, when the air filter element 8 is positioned at the lid 12, ensures that the air filter element 8 can be contactably sealed against the lid 12. For this purpose, the air filter element 8 made of a foam plastics material can be drawn over a retainer 23 to endow the air filter element 8 with the necessary dimensional stability.

Locating the air filter element 8 on the lid 12 results in it being held to the lid by the engagement of the two ends 24, 25 of the spring clip 13 at the lid. A retaining pin 26 arranged at the spring clip 13 engages a hole in a socket 27 of the retainer 23, thus ensuring that due to the spring-loading of the element 8, its sealing edge 14 is in reliable contact with the underside of the lid section 12.

The air intake apparatus in accordance with the present disclosure ensures that the filter element (cleaner) may be quickly and easily accessed, removed and, for example, cleaned without requiring the use of any tools. For this purpose the user of the vehicle fitted therewith, for example someone riding an ATV, merely needs to remove or hinge open the rider saddle on the vehicle to gain free access to the air intake apparatus beneath the rider saddle. Since the duct of the air intake apparatus is flexible, the air intake apparatus can be hingeably opened away from the case, with the air filter element yet remaining joined to the air intake apparatus. Configuring the case of the air intake apparatus in accordance with the present disclosure integrally with the mudguards significantly diminishes contamination by the flow of ambient air into the case entraining debris such as dirt, sand, water and the like, as compared to known air intake assemblies.

It is understood that as regards all features of the invention not explained above in detail reference is expressly made to the claims and the drawing.

LIST OF REFERENCE NUMERALS 1 air intake assembly
2 frame structure
3 rider saddle
3a protuberance
4 means
5 duct
5a bracing rib
6 end portion
7 coupling
8 air filter element
9 curved element
10 case
11 air intake snorkel
12 section, lid
13 spring clip
14 sealing edge
15 mudguard
16 side wall
17 case floor
18 inner space
19 drain port
20 detent hole
21 circumferential edge
22 face
23 retainer
24 end
25 end
26 retaining pin
27 socket
26 retainer
29 sleeve
B arrow Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. An air intake apparatus for a vehicle powered by an internal combustion engine, the apparatus having means for fluidly communicating, in the direction of the engine, cleaned intake air for combustion, an air filter element on the communicating means, and a case for housing the air filter element, wherein the communicating means is hingeable such that the air filter element is movable from within the case to an open position while the air filter element remains located on the communicating means.

2. The air intake apparatus as set forth in claim 1, wherein:
   the communicating means comprises a lid section to which the air filter element is releasably attached; and
   the lid section is contactable with a top of the case to provide a lid for the case.

3. The air intake apparatus as set forth in claim 2, wherein the communicating means comprises:
   a curved element opening towards and attachable to the lid section; and
   a duct portion fluidly communicating cleaned intake air and comprising:
     a closed profile cross-section integrated with the curved element; and
     an output end portion opposite the curved element.

4. The air intake apparatus as set forth in claim 3, wherein the duct portion of the communicating means is flexible whereby the communicating means is hingeably movable from the top of the case.

5. The air intake apparatus as set forth in claim 3, wherein the duct further comprises within its closed profile at least one longitudinal bracing rib.

6. The air intake apparatus as set forth in claim 2, wherein the air filter element comprises a dome-shaped foam plastic element with a sealing edge, and further comprising:
   a ported retainer, disposable between the lid section and the filter element, for stabilizing the foam plastic element; and
   a spring clip for urging the sealing edge into contact with the lid section.

7. The air intake apparatus as set forth in claim 6, wherein when the sealing edge of the foam plastic element is in contact with the lid section, the foam plastic element is suspended in the case.

8. The air intake apparatus as set forth claim 1, wherein the case is integrated with mudguards extending in the longitudinal direction of the case and away therefrom on both sides.

9. The air intake apparatus as set forth in claim 3, wherein the duct fluidly communicates intake air in the longitudinal direction of the case, and further comprising, longitudinally opposite the output end portion of the duct, an air intake snorkel for fluidly communicating ambient air into the case.

10. The air intake apparatus as set forth in claim 9, wherein the intake snorkel is adapted for arrangement below a rider saddle of the vehicle.

11. The air intake apparatus as set forth in claim 1, wherein the case comprises:
    side walls;
    a case floor, integrally formed with the side walls, and defining, in a section transversely to the longitudinal direction of the case, an inverted saddle-roof shape; and
    a drain port at a lowest point of the case floor.

12. The air intake apparatus as set forth in claim 2, wherein the communicating means is arranged beneath a rider saddle of a vehicle.

13. The air intake apparatus as set forth in claim 2, wherein the communicating means is disposed at a frame structure of the vehicle.

14. The air intake apparatus as set forth in claim 12, wherein the vehicle is an all-terrain vehicle.

15. An air intake apparatus for a vehicle powered by an internal combustion engine, the apparatus having means for fluidly communicating, in the direction of the engine, cleaned intake air for combustion, an air filter element on the communicating means, and a case for housing the air filter element, wherein the communicating means is hingeable such that the air filter element is movable from within the case to an open position at least partially outside the case while the air filter element remains located on the communicating means.

* * * * *